United States Patent [19]
Yashchin et al.

[11] Patent Number: 5,832,433
[45] Date of Patent: Nov. 3, 1998

[54] SPEECH SYNTHESIS METHOD FOR OPERATOR ASSISTANCE TELECOMMUNICATIONS CALLS COMPRISING A PLURALITY OF TEXT-TO-SPEECH (TTS) DEVICES

[75] Inventors: Dina Yashchin, Yorktown Heights; Sara Basson, White Plains; Ashok Kalyanswamy, Millwood, all of N.Y.; Kim Silverman, Mountain View, Calif.

[73] Assignee: Nynex Science and Technology, Inc., White Plains, N.Y.

[21] Appl. No.: 669,145

[22] Filed: Jun. 24, 1996

[51] Int. Cl.⁶ .................................................... G10L 5/00
[52] U.S. Cl. ...................... 704/260; 704/270; 704/235; 379/88; 379/89; 379/67
[58] Field of Search ................................. 379/88, 89, 67; 704/270, 235, 260

[56] References Cited

U.S. PATENT DOCUMENTS 3,704,345  11/1972  Coker et al. .......................... 179/1 SA
3,739,348   6/1973  Manly .................................. 340/172.5

(List continued on next page.)

OTHER PUBLICATIONS

S. Basson, D. Yashchin, K. Silverman, A. Kalyanswamy, "Assessing the Acceptability of Automated Customer Name and Address: A Rigorous Comparison of Text–to–Speech Synthesizers", AVIOS Proceedings, 1991.
S. Basson, D. Yashchin, K. Silverman, A. Kalyanswamy, "Results from Automating a Name and Address Service with Speech Synthesis", AVIOS Proceedings, 1992.
S. Basson, D. Yashchin, K. Silverman, J. Silverman, A. Kalyanswamy, "Synthesizer Intelligibility in the Context of a Name–and–Address Information Service", EURO-SPEECH Proceedings, 1993.
S. Basson, D. Yashchin, K. Silverman, A. Kalyanswamy, "Comparing Synthesizers for Name and Address Provision: Field Trial Results", EUROSPEECH Proceedings, 1993.
S. Basson, D. Yashchin, K. Silverman, J. Silverman, A. Kalyanswamy, "Comparing Synthesizers for Name and Address Provision", AVIOS Proceedings, 1993.
K. Silverman, A. Kalyanswamy, "Say What?—Problems in Preprocessing Names and Addresses for Text–to–Speech Conversion", AVIOS Proceedings, 1991.
K. Silverman, A. Kalyanswamy, "Processing Information in Preparation for Speech Synthesis", 54th Annual Meeting of the American Society for Information Sciences Proceedings, 1991.
S. Basson, D. Yashchin, K. Silverman, J. Silverman, A. Kalyanswamy, "Preparing Text for a Synthesizer in a Telecommunications Application", IEEE International Workshop on Telecommunications Applications of Speech Proceedings, 1992.
S. Basson, D. Yashchin, A. Kalyanswamy, K. Silverman, Comparing Synthesizers for Name and Address Provision. Field Trial Results.

*Primary Examiner*—David R. Hudspeth
*Assistant Examiner*—Vijay B. Chawan
*Attorney, Agent, or Firm*—Michaelson& Wallace; Peter L. Michaelson; Michael P. Straub

[57] ABSTRACT

Methods and apparatus are described for providing automated operator services and in particular, a reverse directory assistance service. A calling customer is connected to an automated system that prompts the caller for a listing identifier which is used by the system to retrieve a textual listing corresponding to the listing identifier from a database of textual listings. The textual listing contains a TTS ID which identifies a particular one TTS device from a plurality of TTS devices and the listing is optionally preprocessed and parsed into a plurality of fields which define the listing. The listing text is then sent to the particular one TTS device for text to speech synthesis of the text contained within the listing. The method further includes teaching the system which one TTS device of the plurality of TTS devices, best synthesizes the text contained within the listing and then identifying that one TTS device within the listing so that subsequent synthesis will utilize that TTS device.

18 Claims, 2 Drawing Sheets

U.S. PATENT DOCUMENTS

| | | | |
|---|---|---|---|
| 4,435,777 | 3/1984 | McCaskill et al. | 364/900 |
| 4,470,150 | 9/1984 | Ostrowski | 381/52 |
| 4,507,753 | 3/1985 | McCaskill et al. | 364/900 |
| 4,685,135 | 8/1987 | Lin et al. | 381/52 |
| 4,689,817 | 8/1987 | Kroon | 381/52 |
| 4,692,941 | 9/1987 | Jacks et al. | 381/52 |
| 4,754,485 | 6/1988 | Klatt | 381/52 |
| 4,783,810 | 11/1988 | Kroon | 381/52 |
| 4,783,811 | 11/1988 | Fisher et al. | 381/52 |
| 4,829,580 | 5/1989 | Church | 381/52 |
| 4,831,654 | 5/1989 | Dick | 381/51 |
| 4,896,359 | 1/1990 | Yamamoto et al. | 381/52 |
| 4,907,279 | 3/1990 | Higuchi et al. | 381/52 |
| 4,916,726 | 4/1990 | Morley, Jr. et al. | 379/88 |
| 4,931,950 | 6/1990 | Isle et al. | 364/513 |
| 4,959,855 | 9/1990 | Daudelin | 379/213 |
| 5,040,218 | 8/1991 | Vitale et al. | 381/52 |
| 5,163,083 | 11/1992 | Dowden et al. | 379/88 |
| 5,179,585 | 1/1993 | MacMillan et al. | 379/88 |
| 5,181,237 | 1/1993 | Dowden et al. | 379/88 |
| 5,181,238 | 1/1993 | Medamana et al. | 379/95 |
| 5,182,709 | 1/1993 | Makus | 364/419 |
| 5,204,905 | 4/1993 | Mitome | 381/52 |
| 5,241,586 | 8/1993 | Wilson et al. | 379/88 |
| 5,349,636 | 9/1994 | Irribarren | 379/89 |
| 5,420,852 | 5/1995 | Anderson et al. | 370/364 |
| 5,469,491 | 11/1995 | Morley, Jr. et al. | 379/88 |
| 5,479,488 | 12/1995 | Lennig et al. | 379/67 |
| 5,511,111 | 4/1996 | Serbetcioglu et al. | 379/67 |
| 5,647,002 | 7/1997 | Brunson | 380/49 |
| 5,652,828 | 7/1997 | Silverman | 395/2.69 |

SPEECH SYNTHESIS METHOD FOR OPERATOR ASSISTANCE TELECOMMUNICATIONS CALLS COMPRISING A PLURALITY OF TEXT-TO-SPEECH (TTS) DEVICES

TECHNICAL FIELD

The invention relates to methods and apparatus for automating the processing of operator assistance type telecommunications calls.

DESCRIPTION OF THE PRIOR ART AND PROBLEM

Over the past several decades a great deal of telephone traffic which used to be handled by operators has been automated. The initial step of automating what was originally operator assistance traffic was to offer customer-dialed long distance call service. Then customer-dialed operator assistance calls were introduced to permit operators to process calls for which the number had already been dialed. Automatic recording of telephone charges were introduced also at that time. Today, the category of fully or partially automated operator assistance telephone traffic includes coin calls, calling card calls, automatic quotation of charges for hotel guest originated calls as well as directory assistance queries.

To address numerous problems associated with this latter category of automated operator assistance calls, namely, automated directory assistance queries, the prior art has developed a number of methods and apparatus. One such method and apparatus, developed to provide a reverse customer name and address service, is described in the literature, see, e.g., Basson, S., Yashchin, D., Silverman, K., and A. Kalyanswamy, *Assessing the Acceptability of Automated Customer Name and Address*, AVIOS Proceedings, 1991.

In a system taught by this prior art, an authorized customer (caller) is provided with name and town information associated with a particular telephone number after stating an authorization code and telephone number. Calls placed to the system, are greeted with a digitized voice and the customer is asked to key in the authorization code and telephone number. A database containing "reverse directory" information is queried and the information contained within the database that pertains to the specified telephone number is returned to the caller as speech by a text-to-speech synthesis (TTS) device.

A problem associated with prior art systems incorporating TTS devices, is that different TTS devices perform differently—as measured by subjective listeners, depending upon the particular text they are required to synthesize into speech. For example, a TTS device No. 1 may be more pleasing and/or intelligible to listeners than a TTS device No. 2 when synthesizing a given word or words. Likewise, TTS device No. 2 may be more pleasing and/or intelligible to listeners than TTS device No. 1 when synthesizing a different word or words.

As a result, the teachings of the prior art require that a designer of a system which incorporates a TTS device, must select a particular TTS device and impose that particular device attributes (both good and bad) on the overall system. That is to say, a system which incorporates a TTS device will generally be good at synthesizing some speech, but not all.

SOLUTION

The above problem is solved and an advance is made over the prior art in accordance with the principles our invention wherein an unattended, automated operator position system is substituted for an operator position providing reverse directory assistance service. Such an unattended position system includes a plurality of TTS devices and a database of textual directory listings. Each of the textual directory listings contain, in addition to a set of fields normally associated with directory listings, i.e., name, address and telephone number, a field which specifies a particular one of the TTS devices that is to synthesize the text contained within the listing.

Advantageously, with this arrangement, the system can provide optimal TTS quality by directing particular textual entries contained within the database to only the particular one TTS device which synthesizes the particular text best.

Therefore, in accordance with the principles of this invention, in a communications network, in response to receipt of a call from a customer, the customer provides additional information such as a telephone number and optionally, a personal identification number (PIN), which in turn, causes a lookup in a database of a listing associated with the telephone number. The listing contains in addition to a typical name field, address field and locality field, a synthesizer ID field which identifies which one of a plurality of TTS devices is to receive this listing for subsequent synthesis. The TTS device identified by this field is, preferably, the one which provides the best synthesis of this listing.

Viewed from one aspect, the invention is a method which provides text to speech synthesis of text contained within a database whereby the TTS device performing the text to speech synthesis, is the one of a plurality of TTS devices that best synthesizes the particular text.

Viewed from another aspect, the invention is a method for identifying which one TTS device of a plurality of TTS devices, best synthesizes the text contained within a database into speech in a manner suitable for listening by humans. In this manner, the best TTS device may be identified for particular text, and then subsequently used to provide text to speech synthesis of that text.

BRIEF DESCRIPTION OF THE DRAWINGS

To facilitate reader understanding, identical reference numerals are used to denote identical or similar elements that are common to the figures. The drawings are not necessarily to scale.

DETAILED DESCRIPTION

Figure 1:
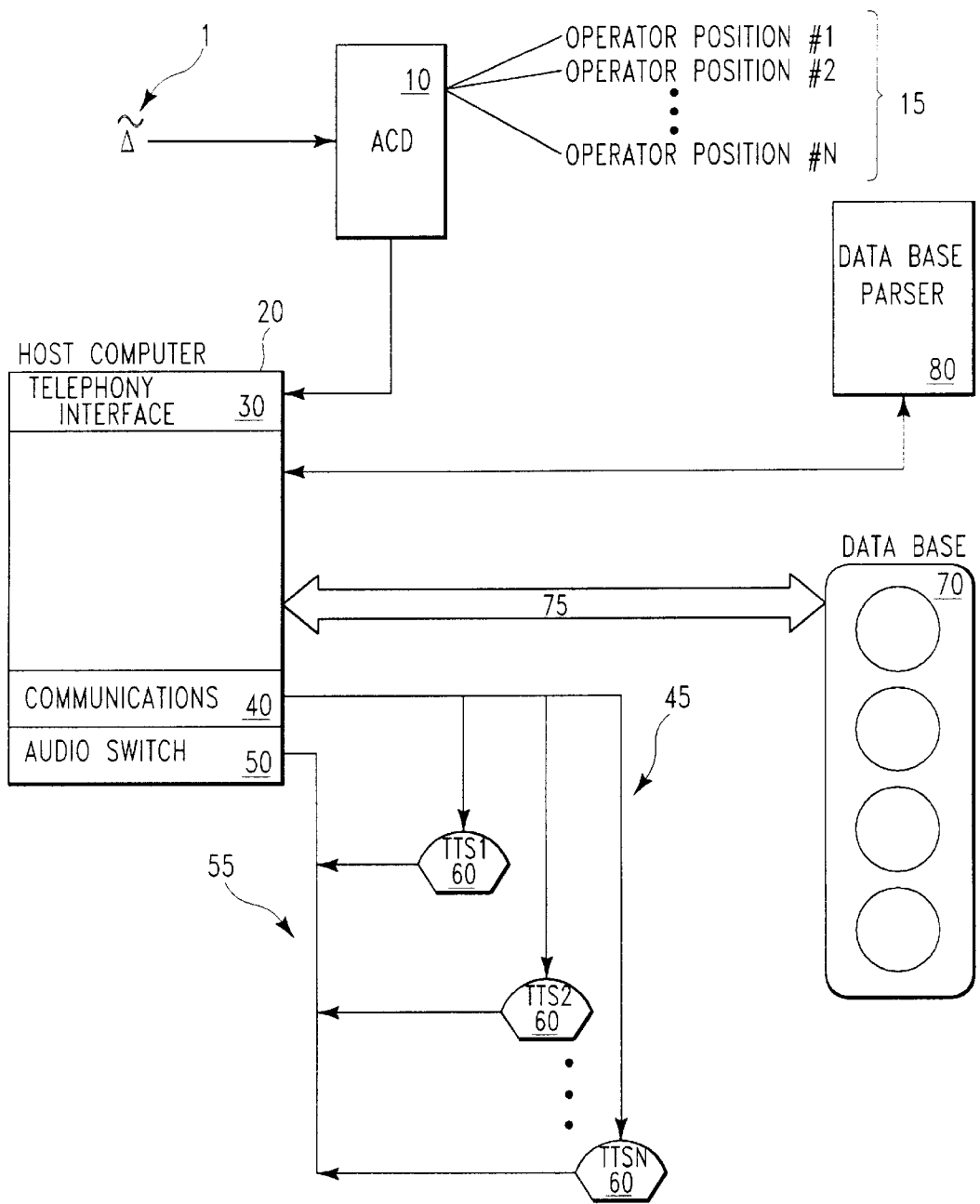
FIG. 1 is an architectural block diagram showing the components of the present invention.

The principles of the present invention may be understood by examining an exemplary embodiment. FIG. 1 is an architectural block diagram showing the components of the present invention. Telephone 1, represents a terminal of a telecommunications service customer who will use the service employing the present invention. ACD 10, is an automatic call distributor which may selectively route incoming calls to either: one of a plurality of operator positions 15, or host computer 20 which advantageously uses the present invention.

Within host computer 20 are various blocks for carrying out the functions of the present invention. Telephony interface 30, is used for Dual-Tone Multi-Frequency (DTMF) detection and for playing digitized messages during periods of customer interaction. Such interfaces are well-known in the art and are available from such sources as Dialogics, Inc., Parsippany, N.J.

Audio switch matrix 50 (Dialogics), is used to connect an audio line to an appropriate one of a plurality of Text-to-Speech devices 60. Each one of the TTS devices may be advantageously housed in a separate computer or stand-alone, depending upon the particular device requirements. In a preferred embodiment, each one of the TTS devices 60 is in communication with host computer 20 through two separate lines, a data line 45 for receiving text to be synthesized from the host computer, and an audio line 55 for transferring the synthesized speech output back to the host computer. Each data line is connected to the host computer 20 through a communications interface 40, which may be any of a variety well known in the art.

Those skilled in the art can readily appreciate that the host computer 20 could be any one of a variety commercially available and well-understood. A preferred host computer comprises an industry standard Personal Computer, having an "AT" type of interface bus capable of receiving a wide variety of interfaces such as the telephony interface 30, communications interface 40 and audio switch interface 50.

The host computer is further interconnected to data base 70 over communications interface 75. The data base contains, typically, a number of telephone directory listings consisting of a textual name, address, locality, telephone number and other entries as locally appropriate. Additionally, each of the individual listings contains a TTS device identifier field that advantageously identifies which one of a plurality of TTS devices is to synthesize the text contained within the listing into speech.

The communications interface 75 which interconnects the data base 70 to host computer 20 can likewise be any of a variety well-known in the art. In particular, the data base 70 can be co-located with host computer 20 and interconnected using a communications interface such as the Small Computer System Interface (SCSI). Alternatively, the data base 70 can be interconnected to host computer 20 using a local or wide-area-network methodology, i.e., Network File System (NFS) using such protocols as Transmission Control Protocol/Internet Protocol (TCP/IP).

Advantageously, parser 80, may be added to the overall system although its use is not required to practice the present invention. The parser receives as input a directory listing contained within the data base 70, and parses this input into a number of fields which are individually more suitable for subsequent speech synthesis by one of the TTS devices 60.

Figure 2:
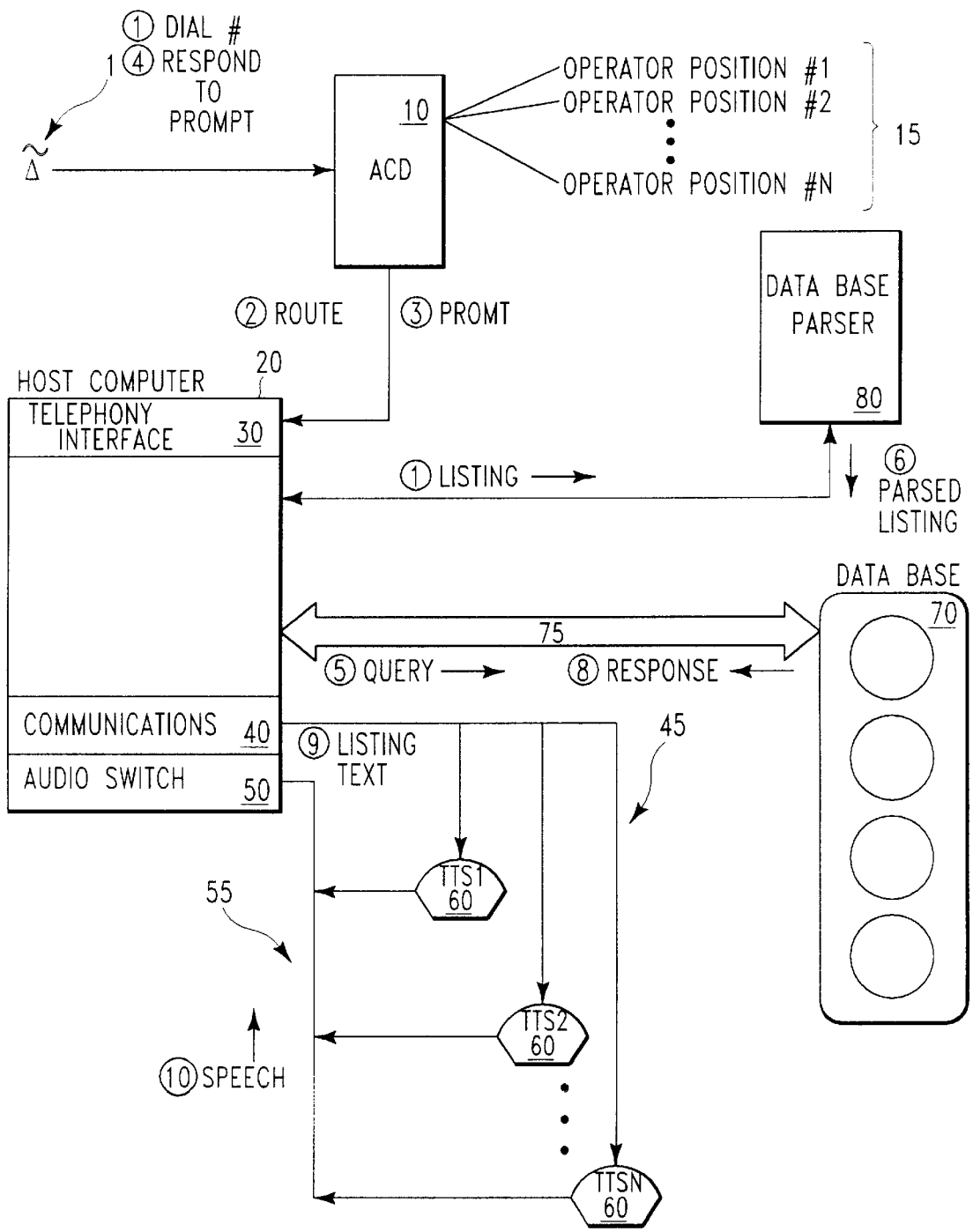
FIG. 2 is an call flow diagram superimposed upon the architectural block diagram of FIG. 1.

In order to illustrate the basic principles of the invention, a simple, reverse directory assistance call from telephone 1 will be described with reference to FIG. 2. The customer at the telephone is referred to as a calling customer or caller. In this example, the caller wishes to receive a name and address associated with a particular telephone number, i.e., reverse directory assistance.

The caller at telephone 1 dials or keys a telephone number corresponding to the reverse directory assistance service. Of course, the particular number dialed to invoke the service is not important to the operation of the invention, such a number could be, for example, "0", or "411" or another service provider designated number. The resultant call, which could be carried by a Local Exchange Carrier (LEC) or an Inter-Exchange Carrier (IXC) is, in a preferred embodiment, terminated at and received by Automatic Call Distributor (ACD) 10.

The function of ACD 10 is to route incoming calls to an appropriate destination. The ACD shown in this exemplary embodiment is not required by the present invention, it merely provides a convenient mechanism to selectively route a number of calls to one or more destinations, i.e., different services such as attended or unattended operator functions.

After the call is established to ACD 10, it is then routed to telephony interface 30 contained within host computer 20. The telephony interface provides an optional number of prompts back to the caller, for example, instructing the caller to enter a telephone number for which to return reverse directory information and collects responses back from the caller. The responses so entered are subsequently examined by the host computer 20 and appropriate queries to data base 70 over communications interface 75 are generated. In response to these queries, data base 70 returns any listings corresponding to the queries back to host computer 20.

In a preferred embodiment, data base parser 80 is employed and the returned listing(s) are communicated to the parser by host computer 20. The data base parser examines the listing and parses it in a form suitable for speech synthesis. For example, one function of such a parser would be to split a representative listing into a name field, address field, and locality field; identify acronyms and any words which are to be spelled-out during speech synthesis. While such a parser is preferred in a system which will synthesize speech from text contained in an existing, populated database, its use is not essential to the present invention.

After the listing is returned to host computer 20 from data base 70 and any optional processing by data base parser 80 is performed, a TTS ID field of the listing is examined and the listing text is sent to a particular TTS device identified by the TTS ID field.

The TTS ID is stored along with other fields of the listing and identifies which one of the plurality of TTS devices that will receive this listing for subsequent speech synthesis. By specifying in the listing the TTS ID of the particular one of the TTS devices that is to receive the listing, it may be assured that the particular TTS device which best synthesizes the listing text into speech is utilized for that particular listing.

As determined by the TTS ID, the listing text is sent to TTS device 60, where the text contained within the listing is synthesized into speech. The speech so generated, is transferred by audio line 55, into audio switch 50 located in host computer 20. The speech is then routed back to the caller operating the telephone 1.

Those skilled in the art can readily appreciate that the apparatus disclosed herein can be utilized to automatically identify the particular one of the plurality of TTS devices which are to receive a particular listing. Specifically, a trial or learning period may be defined wherein the system, in addition to providing the synthesized speech corresponding to a particular directory listing, queries the caller for feedback pertaining to aspects of the synthesized speech. For example, a caller may be asked to rate the quality of the synthesized speech on a scale of 1 to 5, say.

During this learning period, when no TTS ID has been assigned to a particular listing, the system can randomly, or preferably rotationally select a TTS device for the listing and then solicit caller feedback about the quality of the synthesized text. Once the system has determined, based upon this caller feedback, which particular one TTS device "best" synthesizes the text contained within the listing, then a TTS ID corresponding to that particular one TTS device may be populated in the listing contained within data base 70. In this inventive manner, the system may "learn" which TTS device a caller prefers for a particular listing and then subsequently send that listing to the preferred TTS device for synthesis. When conditions change, i.e., new or improved TTS devices, application to different caller demographics, etc., the learning period may be repeated and perhaps another preferred TTS device identified.

The above description is considered to be only an illustrative embodiment of the invention. Other alternatives are possible without departing from the scope of the invention. For example it would be straightforward for one skilled in the art to implement this invention with any number of TTS devices. Furthermore, although the invention is described as having particular listings sent to a particular TTS device, it is within the scope of this invention to have particular listings sent to a particular TTS device based upon, for example, which TTS device preferably synthesizes a particular regional accent, i.e., New England, Southern, or others. It is to be understood that various and numerous other arrangements may be devised by one skilled in the art without departing from the scope of the invention. The invention is thus limited only as defined in the accompanying claims.

We claim:

1. In a telecommunications system comprising a database of text entries and a plurality of TTS devices, a method for synthesizing the text contained within the entries comprising the steps of:

establishing a call from a user to a system telephony interface;

prompting the user for an entry identifier;

retrieving a text entry and a TTS identifier associated with said text entry, said text entry corresponding to said entry identifier, the TTS identifier identifying one of the plurality of TTS devices; and transmitting text included within the retrieved entry to the one of the plurality of TTS devices identified by the TTS identifier.

2. The method according to claim 1, further comprising the steps of:

parsing the text included in the received text entry into one or more distinct fields.

3. The method according to claim 1, wherein said prompting step further comprises the steps of:

prompting the user for a personal identification number.

4. The method according to claim 3, wherein said parsing step parses the retrieved text entry into a name field, an address field and a locality field.

5. The method according to claim 1, wherein said entry identifier is a telephone number.

6. The method according to claim 1, further comprising the step of:

training the system to select which particular one of the plurality of TTS devices is to be used to synthesize the text contained within a particular text entry and modifying the TTS ID associated with that particular entry to be associated with the particular selected one of the plurality of TTS devices.

7. The method according to claim 6, wherein said training step comprises the step of:

prompting the user, after the completion of said transmitting step, for a user provided qualitative assessment of the quality of the speech synthesized by said one of the plurality of TTS devices from said text contained within the particular entry.

8. The method according to claim 7, further comprising the steps of:

parsing the text into one or more distinct fields.

9. The method according to claim 7, wherein said prompting step further comprises the steps of:

prompting the user for a personal identification number.

10. The method according to claim 7, wherein said entry identifier is a telephone number.

11. The method according to claim 8, wherein said parsing step parses the retrieved text entry into a name field, an address field and a locality field.

12. A system for synthesizing speech comprising:

a plurality of text to speech (TTS) devices;

a physical storage device including a database coupled to the plurality of TTS devices, the data base including a plurality of text entries and a plurality of TTS device identifiers, each TTS device identifier corresponding to one of the plurality of TTS devices, each one of the text entries having one of the TTS identifiers associated therewith.

13. The system of claim 12, further comprising:

means for retrieving one of said text entries and the TTS identifier associated with said text entry from the database; and means for sending the retrieved text entry to the one of the TTS devices identified by the retrieved TTS identifier associated with said retrieved text entry.

14. The system of claim 13, wherein each one of the entries in the database includes:

a text field; and a TTS device identifier field.

15. The system of claim 14, wherein each one of the entries in the database further includes:

a name field; and a telephone number field.

16. The system of claim 13, further comprising:

an input device for receiving feedback from a listener; and means for modifying the TTS identifier in the database associated with a particular one of the text entries in response to feedback from a listener.

17. The system of claim 16, wherein the input device includes a telephone.

18. The system of claim 16, wherein the plurality of TTS devices includes TTS devices with different speech synthesis characteristics.

* * * * *